US012366174B2

(12) United States Patent
Ouchi et al.

(10) Patent No.: US 12,366,174 B2
(45) Date of Patent: Jul. 22, 2025

(54) CONTROL DEVICE, CONTROL METHOD, AND SYSTEM

(71) Applicant: MITSUBISHI HEAVY INDUSTRIES, LTD., Tokyo (JP)

(72) Inventors: Toshiaki Ouchi, Tokyo (JP); Keisuke Yamamoto, Tokyo (JP); Tateki Nakamura, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/712,911

(22) PCT Filed: Sep. 27, 2022

(86) PCT No.: PCT/JP2022/035945
§ 371 (c)(1),
(2) Date: May 23, 2024

(87) PCT Pub. No.: WO2023/100457
PCT Pub. Date: Jun. 8, 2023

(65) Prior Publication Data
US 2024/0418100 A1 Dec. 19, 2024

(30) Foreign Application Priority Data
Nov. 30, 2021 (JP) ................................ 2021-194470

(51) Int. Cl.
*F01D 17/14* (2006.01)
*F01D 15/00* (2006.01)
*F01K 17/04* (2006.01)

(52) U.S. Cl.
CPC ........... *F01D 17/145* (2013.01); *F01D 15/00* (2013.01); *F01K 17/04* (2013.01); *F05D 2220/72* (2013.01)

(58) Field of Classification Search
CPC .......... F01D 17/145; F01D 15/00; F01D 3/04; F01D 17/00; F01D 17/10; F01D 25/16;
(Continued)

(56) References Cited

U.S. PATENT DOCUMENTS 6,892,540 B1 * 5/2005 Tisenchek ................ F01D 3/02
60/645
8,662,820 B2 * 3/2014 Sathyanarayana ........ F01K 7/22
415/36
(Continued)

FOREIGN PATENT DOCUMENTS

JP S60-040703 A 3/1985
JP 2008-008291 A 1/2008
(Continued)

OTHER PUBLICATIONS

International Search Report dated Nov. 22, 2022, issued in counterpart Application No. PCT/JP2022/035945. (6 pages).
(Continued)

*Primary Examiner* — Jesse S Bogue
(74) *Attorney, Agent, or Firm* — WHDA, LLP

(57) ABSTRACT

This control device comprises: an acquiring unit for acquiring, as a first inlet pressure, a pressure value of first steam on a first inlet side as seen from a first regulating valve of a first turbine that rotates using the first steam, which is supplied from the first inlet via the first regulating valve, and acquiring, as a second inlet pressure, a pressure value of second steam on a second inlet side as seen from a second regulating valve of a second turbine that rotates on the same rotating shaft as the first turbine using the second steam, which is supplied from the second inlet via the second regulating valve; and a control unit for regulating an opening degree of the first regulating valve and an opening degree of
(Continued)

the second regulating valve in accordance with the first inlet pressure and the second inlet pressure.

7 Claims, 10 Drawing Sheets

(58) Field of Classification Search
CPC ........ F01K 17/04; F01K 7/20; F05D 2220/72; F05D 2220/31; F05D 2270/051
See application file for complete search history.

(56) References Cited

U.S. PATENT DOCUMENTS

| | | | | |
|---|---|---|---|---|
| 8,857,184 | B2 * | 10/2014 | Sathyanarayana | F01D 19/00 60/646 |
| 9,080,466 | B2 * | 7/2015 | Kluge | F01K 13/02 |
| 2004/0101395 | A1 * | 5/2004 | Tong | F01D 3/04 415/26 |
| 2008/0003095 | A1 | 1/2008 | Tisenchek et al. | |
| 2011/0318169 | A1 * | 12/2011 | Zheng | F01D 21/14 415/169.1 |
| 2014/0199161 | A1 * | 7/2014 | Holder | F01K 3/04 415/104 |
| 2014/0373541 | A1 | 12/2014 | Kato | |
| 2020/0040732 | A1 | 2/2020 | Koda | |

FOREIGN PATENT DOCUMENTS

| | | | |
|---|---|---|---|
| JP | 2012-007610 | A | 1/2012 |
| JP | 5397560 | B1 | 1/2014 |
| JP | 2014-202136 | A | 10/2014 |
| JP | 2018-091224 | A | 6/2018 |
| WO | 2018/167907 | A1 | 9/2018 |

OTHER PUBLICATIONS

Written Opinion dated Nov. 22, 2022, issued in counterpart Application No. PCT/JP2022/035945, with English Translation. (8 pages).

* cited by examiner

CONTROL DEVICE, CONTROL METHOD, AND SYSTEM

CROSS REFERENCES TO RELATED APPLICATIONS

The present application claims priority under 35 U.S.C. § 119 to Japanese Patent Application No. 2021-194470, filed Nov. 30, 2021. The contents of this application are incorporated herein by reference in their entirety.

TECHNICAL FIELD

The present disclosure relates to a control device, a control method, and a system.

BACKGROUND ART

In an extraction or mixed pressure steam turbine, there is a problem in that a thrust force applied to a rotor has to be suppressed to be within an allowable value (refer to, for example, PTL 1).

CITATION LIST

Patent Literature

[PTL 1] International Publication No. WO2018/167907

SUMMARY OF INVENTION

Technical Problem

The present disclosure has been made to solve the above problem, and an object thereof is to provide a control device, a control method, and a system capable of controlling a thrust force in a steam turbine within an allowable value.

Solution to Problem

In order to solve the above problem, a control device according to the present disclosure includes: an acquisition unit that acquires, when viewed from a first control valve of a first turbine that rotates using first steam supplied from a first inlet via the first control valve, a pressure value of the first steam on a first inlet side as a first inlet pressure, and acquires, when viewed from a second control valve of a second turbine that rotates about a same rotary shaft as the first turbine using second steam supplied from a second inlet via the second control valve, a pressure value of the second steam on a second inlet side as a second inlet pressure; and a control unit that controls a valve opening degree of the first control valve and a valve opening degree of the second control valve according to the first inlet pressure and the second inlet pressure.

A control method according to the present disclosure includes: a step of acquiring, when viewed from a first control valve of a first turbine that rotates using first steam supplied from a first inlet via the first control valve, a pressure value of the first steam on a first inlet side as a first inlet pressure, and acquiring, when viewed from a second control valve of a second turbine that rotates about a same rotary shaft as the first turbine using second steam supplied from a second inlet via the second control valve, a pressure value of the second steam on a second inlet side as a second inlet pressure; and a step of controlling a valve opening degree of the first control valve and a valve opening degree of the second control valve according to the first inlet pressure and the second inlet pressure.

A system according to the present disclosure includes: a first control valve; a second control valve; a first turbine that rotates using first steam supplied from a first inlet via the first control valve; a second turbine that rotates about a same rotary shaft as the first turbine using second steam supplied from a second inlet via the second control valve; an acquisition unit that acquires, when viewed from the first control valve, a pressure value of the first steam on a first inlet side as a first inlet pressure, and acquires, when viewed from the second control valve, a pressure value of the second steam on a second inlet side as a second inlet pressure; and a control unit that controls a valve opening degree of the first control valve and a valve opening degree of the second control valve according to the first inlet pressure and the second inlet pressure.

Advantageous Effects of Invention

According to the control device, the control method, and the system of the present disclosure, a thrust force in a steam turbine can be controlled within an allowable value.

DESCRIPTION OF EMBODIMENTS

Figure 1:
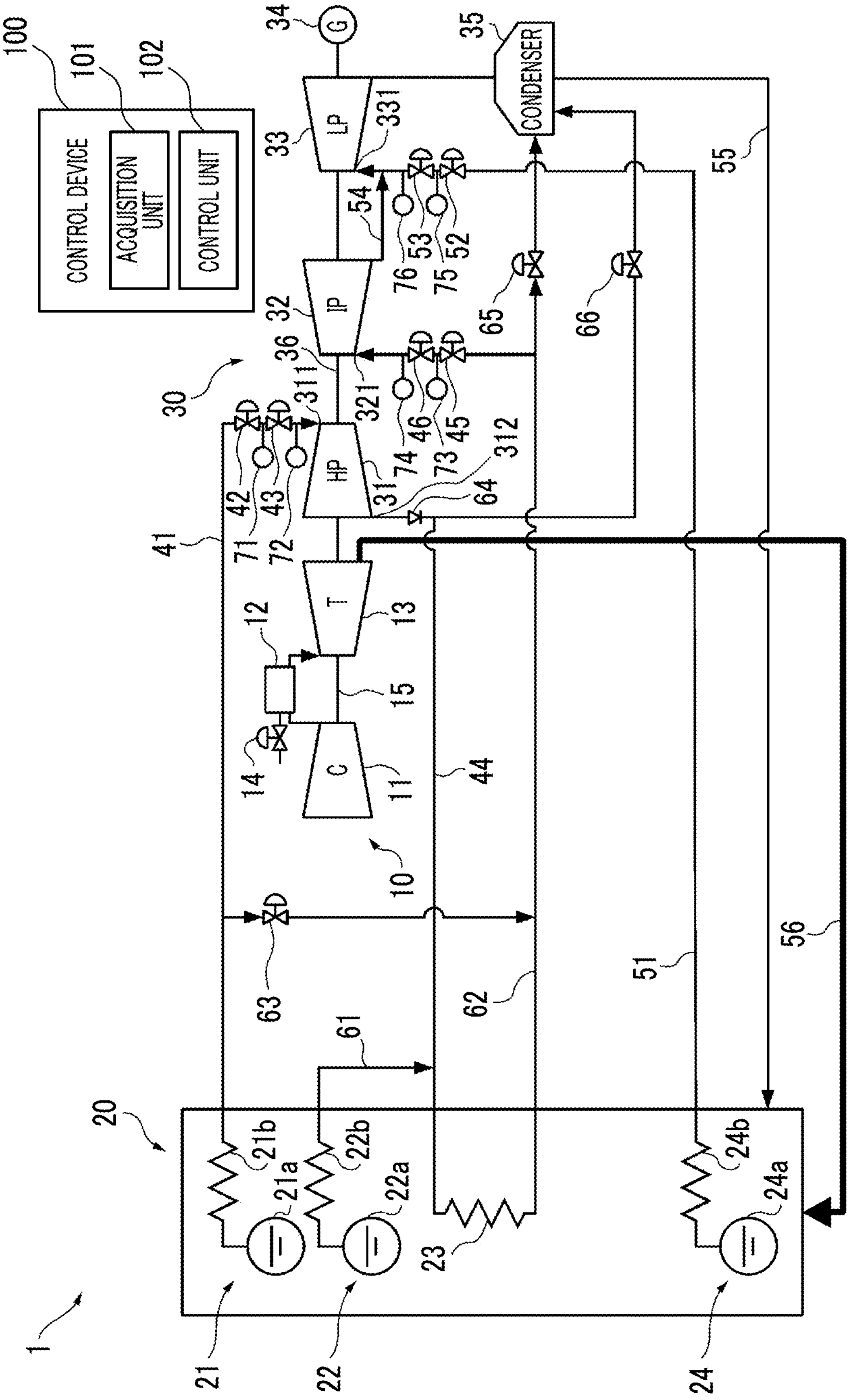
FIG. 1 is a system diagram of a system according to a first embodiment of the present disclosure.

Hereinafter, a control device, a control method, and a system according to an embodiment of the present disclosure will be described with reference to the drawings. In each drawing, identical or corresponding configurations are denoted by the same reference numerals, and the description thereof will be omitted as appropriate.

First Embodiment (System and Control Device)

Figure 2:
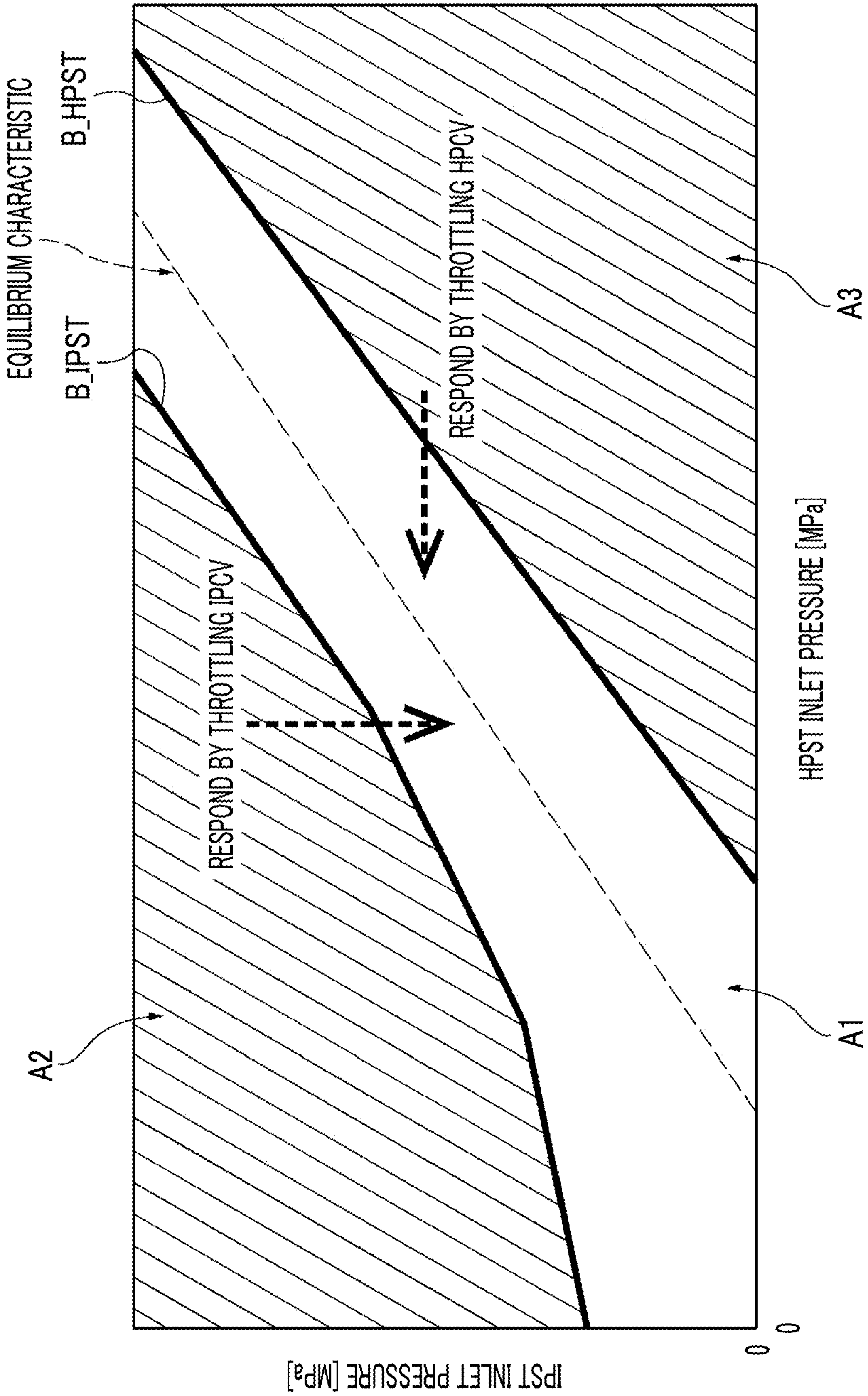
FIG. 2 is a schematic diagram for describing an operation example of a control device according to the first embodiment of the present disclosure.
Figure 3:
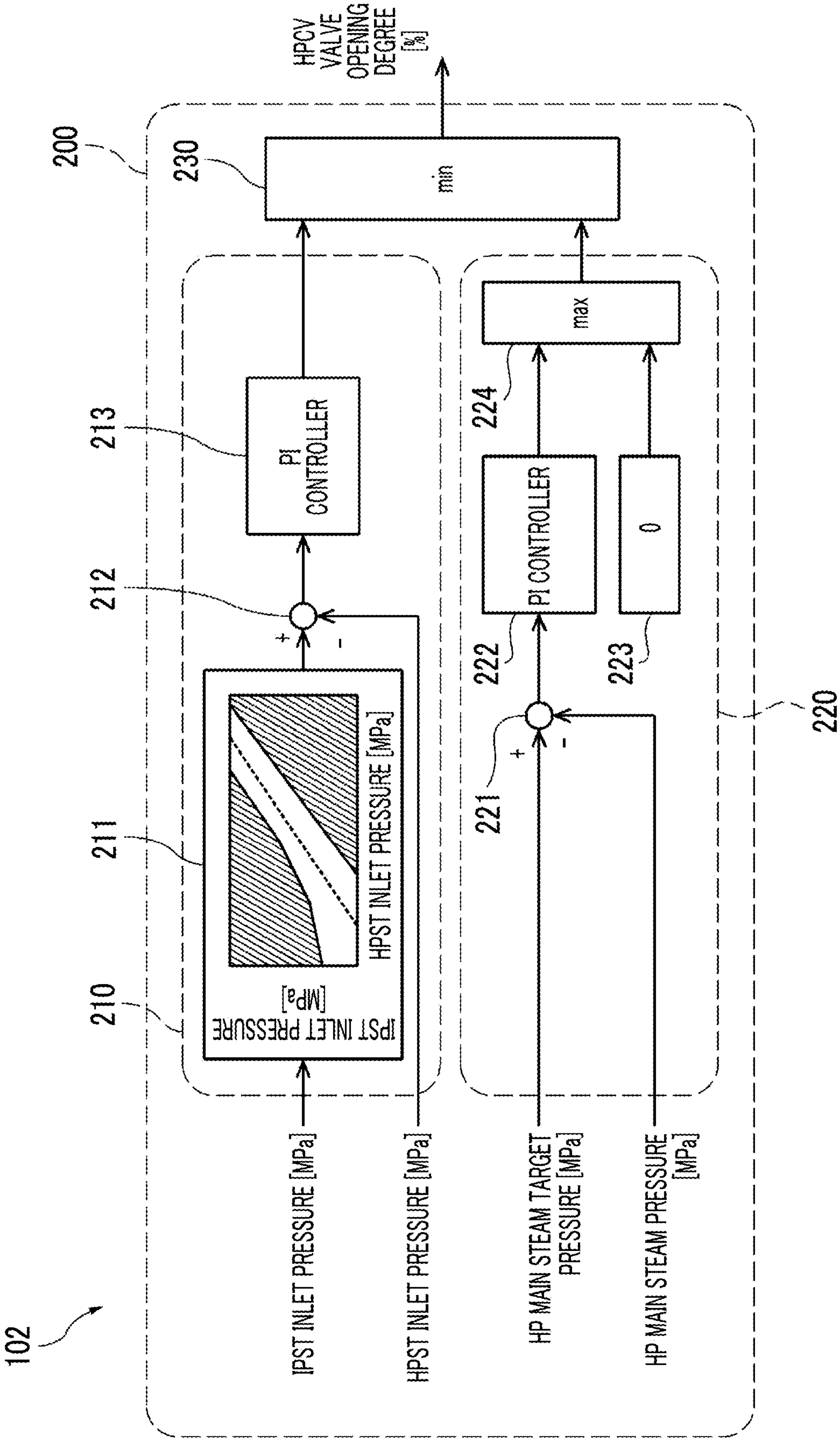
FIG. 3 is a block diagram for describing a configuration example of the control device according to the first embodiment of the present disclosure.
Figure 4:
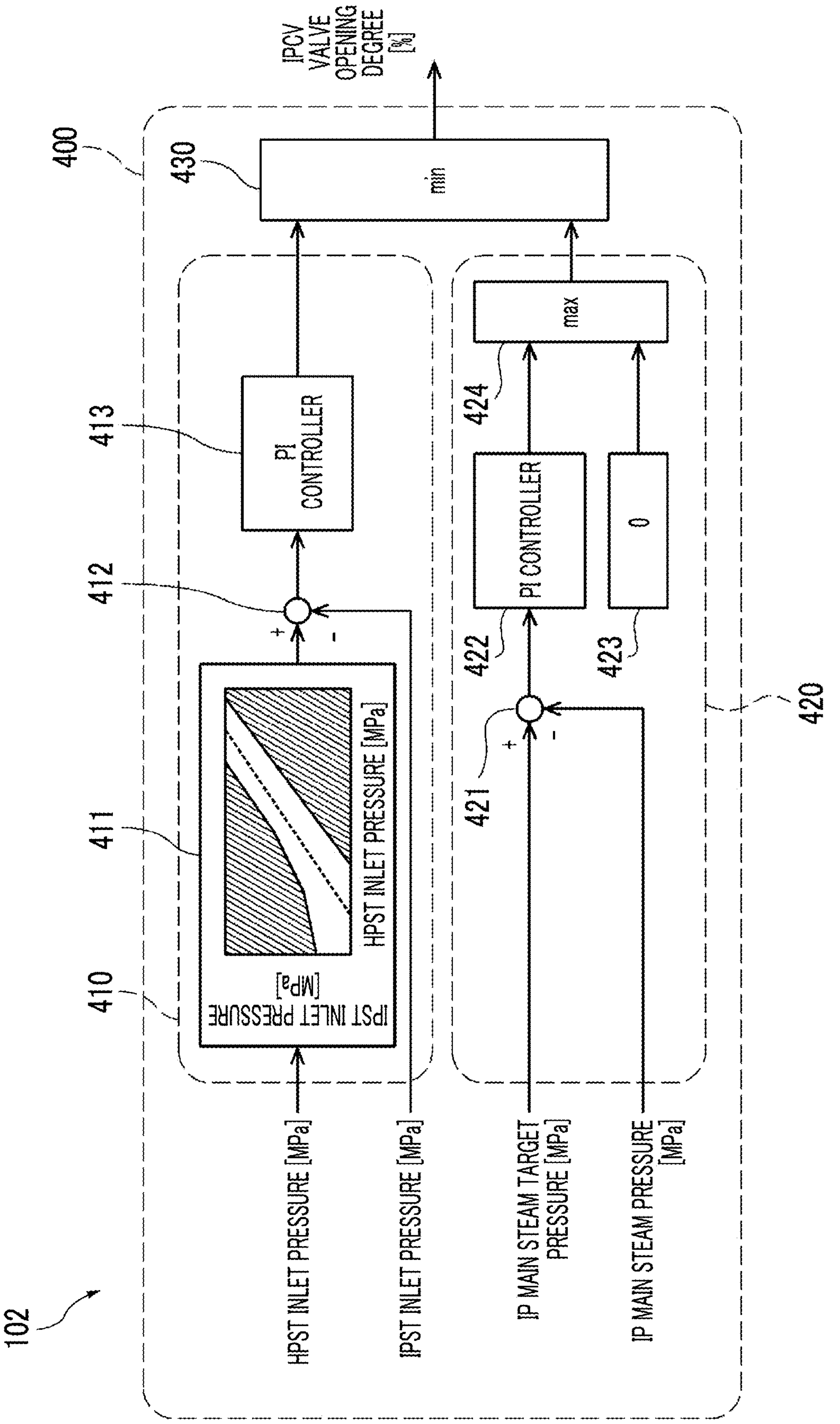
FIG. 4 is a block diagram for describing the configuration example of the control device according to the first embodiment of the present disclosure.
Figure 5:
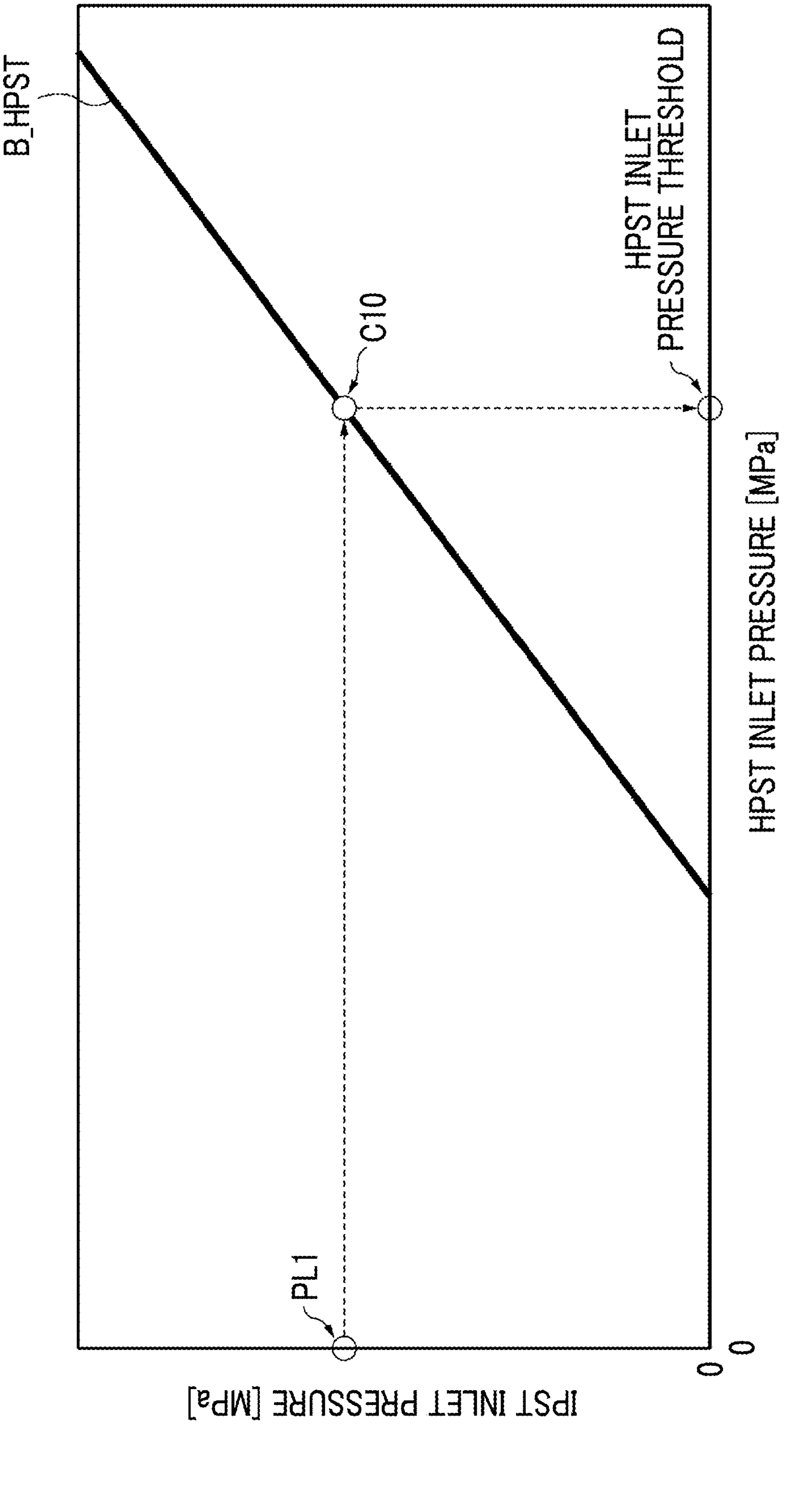
FIG. 5 is a schematic diagram for describing the operation example of the control device according to the first embodiment of the present disclosure.
Figure 6:
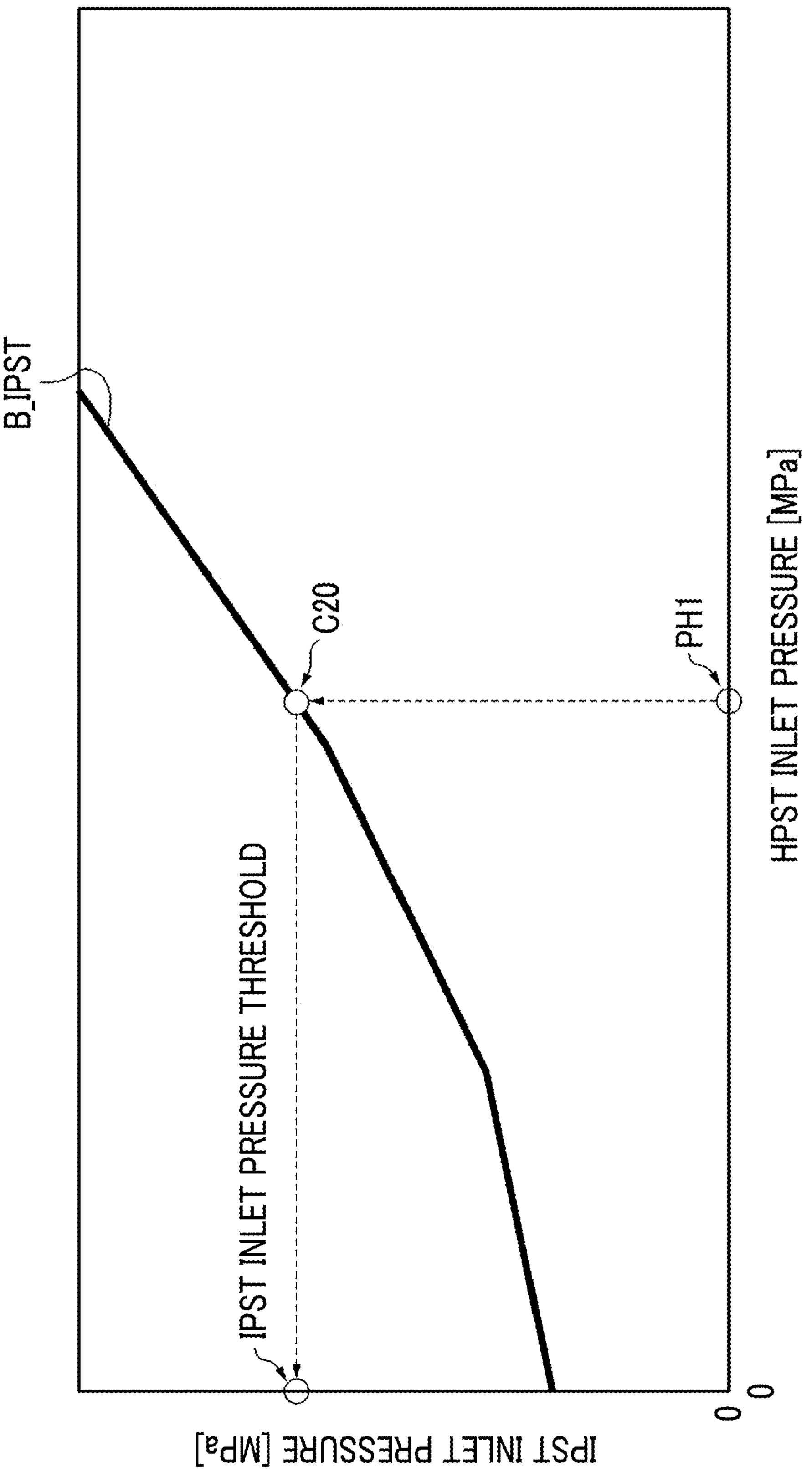
FIG. 6 is a schematic diagram for describing the operation example of the control device according to the first embodiment of the present disclosure.

A configuration and an operation example of a system and a control device according to a first embodiment of the present disclosure will be described with reference to FIGS. 1 to 6. FIG. 1 is a system diagram of the system according to the first embodiment of the present disclosure. FIGS. 2, 5, and 6 are schematic diagrams for describing the operation example of the control device according to the first embodiment of the present disclosure. FIGS. 3 and 4 are block diagrams for describing a configuration example of the control device according to the first embodiment of the present disclosure.

FIG. 1 shows an example of a system diagram in a case where the system according to the first embodiment of the present disclosure is applied to a gas turbine combined cycle power plant (GTCC). A system 1 shown in FIG. 1 includes a gas turbine 10, a heat recovery steam generator 20, a steam turbine 30, a generator 34, a condenser 35, and a control device 100. The steam turbine 30 includes a high-pressure steam turbine 31, a medium-pressure steam turbine 32, a low-pressure steam turbine 33, and a rotary shaft 36 of each of the turbines 31, 32, and 33. The generator 34 is driven by each of the turbines 10, 31, 32 and 33 to generate power. The condenser 35 converts steam exhausted from the low-pressure steam turbine 33 and the like back into water.

The gas turbine 10 includes a compressor 11, a combustor 12, a turbine 13, a fuel flow rate control valve 14, and a rotary shaft 15. The compressor 11 compresses outside air to generate compressed air. The combustor 12 mixes the compressed air with a fuel gas and burns the mixture to generate a high-temperature combustion gas. The turbine 13 is driven by the combustion gas. The fuel flow rate control valve 14 controls a fuel flow rate supplied to the combustor 12. The rotary shaft 15 is a rotary shaft of the compressor 11 and the turbine 13. A fuel line that supplies a fuel from a fuel supply source to the combustor 12 is connected to the combustor 12. The fuel flow rate control valve 14 is provided in the fuel line. An exhaust port of the turbine 13 is connected to an exhaust line 56 of the heat recovery steam generator 20.

The heat recovery steam generator 20 includes a high-pressure steam generating section 21, a medium-pressure steam generating section 22, a reheating section 23, and a low-pressure steam generating section 24. The heat recovery steam generator 20 generates steam by means of the heat of the exhaust gas exhausted from the gas turbine 10. The high-pressure steam generating section 21 includes a drum 21*a* and a heat exchanger 21*b*, and generates high-pressure steam to be supplied to the high-pressure steam turbine 31. The medium-pressure steam generating 22 includes a drum 22*a* and a heat exchanger 22*b*, and generates medium-pressure steam to be supplied to the medium-pressure steam turbine 32. The reheating section 23 heats the steam exhausted from the medium-pressure steam generating section 22 and the like. The low-pressure steam generating section 24 includes a drum 24*a* and a heat exchanger 24*b*, and generates low-pressure steam to be supplied to the low-pressure steam turbine 33.

The high-pressure steam generating section 21 and a steam inlet 311 of the high-pressure steam turbine 31 are connected to each other by a high-pressure main steam line 41 that guides the high-pressure steam to the high-pressure steam turbine 31 via a high-pressure steam stop valve 42 and a high-pressure main steam regulating valve 43. The high-pressure main steam line 41 is connected to a medium-pressure main steam line 62 via a high-pressure steam turbine bypass valve 63. A steam outlet of the high-pressure steam turbine 31 is connected to a medium-pressure main steam line 44 via a check valve 64 and is connected to the condenser 35 via a ventilator valve 66. The medium-pressure main steam line 44 joins a medium-pressure main steam line 61 from the medium-pressure steam generating section 22 on a steam inlet side of the reheating section 23. A steam outlet side of the reheating section 23 is connected to a steam inlet 321 of the medium-pressure steam turbine 32 via a medium-pressure steam stop valve 45 and a medium-pressure main steam regulating valve 46 with the medium-pressure main steam line 62. The medium-pressure main steam line 62 is connected to the condenser 35 via a medium-pressure steam turbine bypass valve 65. A steam inlet 331 of the low-pressure steam turbine 33 is connected to a steam outlet of the medium-pressure steam turbine 32 with a medium-pressure turbine exhaust line 54, and is connected to the low-pressure steam generating section 24 with a low-pressure main steam line 51 that guides the low-pressure steam to the low-pressure steam turbine 33 via a low-pressure steam stop valve 52 and a low-pressure main steam regulating valve 53. The condenser 35 is connected to a steam outlet of the low-pressure steam turbine 33. A supply water line 55 that guides condensate to the heat recovery steam generator 20 is connected to the condenser 35.

The high-pressure main steam regulating valve 43 regulates an inflow amount of steam to the high-pressure steam turbine 31 under the control of the control device 100. The medium-pressure main steam regulating valve 46 regulates an inflow amount of steam to the medium-pressure steam turbine 32 under the control of the control device 100. The low-pressure main steam regulating valve 53 regulates an inflow amount of steam to the low-pressure steam turbine 33 under the control of the control device 100. In addition, the high-pressure main steam regulating valve 43, the medium-pressure main steam regulating valve 46, and the low-pressure main steam regulating valve 53 control valve opening degrees based on command values of valve opening degrees (hereinafter, referred to as valve opening degree command values) sent from the control device 100.

A pressure gauge 71 for measuring high-pressure main steam is provided upstream of the high-pressure main steam regulating valve 43. A pressure gauge 72 for measuring depressurized high-pressure steam is provided downstream of the high-pressure main steam regulating valve 43. The pressure gauge 72 measures a pressure value of the high-pressure steam on a steam inlet 311 side as viewed from the high-pressure main steam regulating valve 43. A pressure gauge 73 for measuring medium-pressure main steam is provided upstream of the medium-pressure main steam regulating valve 46. A pressure gauge 74 for measuring depressurized medium-pressure steam is provided downstream of the medium-pressure main steam regulating valve 46. The pressure gauge 74 measures a pressure value of the medium-pressure steam on a steam inlet 321 side as viewed from the medium-pressure main steam regulating valve 46. A pressure gauge 75 for measuring low-pressure main steam is provided upstream of the low-pressure main steam regulating valve 53. A pressure gauge 76 for measuring depressurized low-pressure steam is provided downstream of the low-pressure main steam regulating valve 53. The pressure gauge 76 measures a pressure value of the low-pressure steam on a steam inlet 331 side as viewed from the low-pressure main steam regulating valve 53.

In the following description and drawings, the pressure value of the high-pressure steam on the steam inlet 311 side measured by the pressure gauge 72 is also referred to as an HPST inlet pressure. The pressure value of the medium-pressure steam on the steam inlet 321 side measured by the pressure gauge 74 is also referred to as an IPST inlet pressure. The high-pressure main steam regulating valve 43 is also referred to as an HPCV. The medium-pressure main steam regulating valve 46 is also referred to as an IPCV. The high-pressure main steam regulating valve 43 and the medium-pressure main steam regulating valve 46 are also referred to as an HP governor valve and an IP governor valve. It should be noted that HPST is an abbreviation for a high-pressure steam turbine. IPST is an abbreviation for a medium-pressure steam turbine. HPCV is an abbreviation for a high-pressure steam control valve. IPCV is an abbreviation for a medium-pressure steam control valve.

The system 1 includes a plurality of sensors (not shown) that measure temperature, pressure, flow rate, rotation speed (rotational speed), and the like of each part.

The control device 100 is configured to include a computer, peripheral devices of the computer, and the like, and includes an acquisition unit 101 and a control unit 102 as functional configured by configurations a combination of hardware such as a computer and software such as a program executed by the computer, and the like. The acquisition unit 101 acquires measurement values of various sensors such as the pressure gauges 71 to 76. The control unit 102 controls each part of the system 1 according to an acquisition result of the acquisition unit 101 or the like. In the present embodiment, for example, the control unit 102 controls the valve opening degree of the HPCV and the valve opening degree of the IPCV according to the HPST inlet pressure and the IPST inlet pressure. In addition, the control unit 102 receives various operation data, instruction data, and the like, and controls an output of the steam turbine 30 by controlling an output of the gas turbine 10, controlling opening and closing of the high-pressure steam stop valve 42, controlling the valve opening degree of the high-pressure main steam regulating valve 43, controlling opening and closing of the medium-pressure steam stop valve 45, controlling the valve opening degree of the medium-pressure main steam regulating valve 46, controlling opening and closing of the low-pressure steam stop valve 52, controlling the valve opening degree of the low-pressure main steam regulating valve 53, and the like to cause the generator 34 to generate power. In addition, in a case where a load cutoff occurs due to any abnormality or the like, the control device 100 performs various controls at the time of the load cutoff.

(Overview of Control of Steam Turbine)

The GTCC generates power by converting feed water in the drums 21*a*, 22*a*, and 24*a* into steam using thermal energy of the exhaust gas of the gas turbine 10 and allowing the steam to pass through the steam turbine 30. The steam turbine 30 includes the high-pressure (HP) steam turbine 31, the medium-pressure (IP) steam turbine 32, and the low-pressure (LP) steam turbine 33. Particularly, when the pressures received by the high-pressure steam turbine 31 and the medium-pressure steam turbine 32 are not balanced, a thrust is pressed against a high-pressure side or a medium-pressure side, resulting in, in the worst case, thrust burnout, which requires a large cost for replacement. A sudden bias between the HPST inlet pressure and the IPST inlet pressure is caused, for example, by a closing operation of the ventilator valve 66 or by an abnormal opening operation of the high-pressure steam turbine bypass valve 63 or of the medium-pressure steam turbine bypass valve 65 when the steam turbine 30 is started. In a normal operation, for example, the control device 100 monitors a main steam pressure (for example, an upstream-side pressure of the high-pressure main steam regulating valve 43) and performs pressure control so that a target steam pressure determined from a load of the gas turbine 10 or the like is reached. In this case, when the medium-pressure main steam rises to the target value or higher, for example, due to the closing operation of the ventilator valve 66, the high-pressure main steam regulating valve 43 is opened in order to lower the main steam pressure. Then, the steam exhausted from the steam outlet of the high-pressure steam turbine 31 reaches the steam inlet 321 through the medium-pressure main steam lines 44 and 64. In this state, the IPST inlet pressure rises, resulting in a thrust imbalance.

Therefore, in the present embodiment, the control device 100 controls the valve opening degree of the HPCV and the valve opening degree of the IPCV by changing an upper limit of the valve opening degree command value so that the balance between the HPST inlet pressure and the IPST inlet pressure is within an allowable range. FIG. 2 shows an outline of the control according to the HPST inlet pressure and the IPST inlet pressure by the control device 100. In FIG. 2, a horizontal axis represents the HPST inlet pressure, a vertical axis represents the IPST inlet pressure, and a correspondence relation between the HPST inlet pressure and the IPST inlet pressure at which the thrust force applied to the rotary shaft 36 becomes appropriate is indicated by a broken line as an equilibrium characteristic. In FIG. 2, a white region A1 is a desired operation region, and hatched regions A2 and A3 are thrust imbalance regions. The region A2 on an upper side of FIG. 2 indicates an excessive IPST inlet pressure, and the region A3 on a lower side indicates an excessive HPST inlet pressure. The control device 100 responds to the region A2 on the upper side indicating the excessive IPST inlet pressure by throttling the IPCV, and responds to the region A3 on the lower side indicating the excessive HPST inlet pressure by throttling the HPCV to operate in target operating balance (targeting the equilibrium characteristic in the figure).

The region A1 shown in FIG. 2 is a range regarding the correspondence relation between the HPST inlet pressure and the IPST inlet pressure based on the equilibrium characteristic which is the correspondence relation between the HPST inlet pressure and the IPST inlet pressure at which the thrust force applied to the rotary shaft 36 becomes appropriate. In this case, the region A1 (range) is a region sandwiched between an upper boundary line B_IPST and a lower boundary line B_HPST of the region A1 (range) when expressed in Cartesian coordinates in which the horizontal axis represents the HPST inlet pressure and the vertical axis represents the IPST inlet pressure. In addition, the control device 100 controls the valve opening degree of the HPCV and the valve opening degree of the IPCV according to the HPST inlet pressure and the IPST inlet pressure with the region A1 (range) as a reference. Here, the control device 100 controls the valve opening degree of the IPCV with reference to an upper boundary line B_IPST side of the region A1 and controls the valve opening degree of the HPCV with reference to a lower boundary line B_HPST side.

Regarding the characteristics and regions shown in FIG. 2, the IPST inlet pressure may be represented on the horizontal axis, and the HPST inlet pressure may be represented on the vertical axis. In that case, the upper boundary line and the lower boundary line are interchanged.

Here, a configuration example of the control unit 102 will be described with reference to FIGS. 3 and 4. FIG. 3 shows a configuration example of a calculation unit 200 that calculates a valve opening degree command value of the HPCV. FIG. 4 shows a configuration example of a calculation unit 400 that calculates a valve opening degree command value of the IPCV. The control unit 102 shown in FIG. 1 includes the calculation unit 200 shown in FIG. 3 and the calculation unit 400 shown in FIG. 4.

The calculation unit 200 shown in FIG. 3 includes a valve opening degree upper limit calculation unit 210, a valve opening degree calculation unit 220, and a minimum value selector 230.

The valve opening degree calculation unit 220 includes a subtractor 221, a PI controller (proportional integral controller) 222, and a maximum value selector 224. The subtractor 221 calculates a deviation of the HP main steam pressure with respect to the target value by subtracting the high-pressure main steam pressure (HP main steam pressure) from the high-pressure main steam target pressure (HP main steam target pressure). The PI controller 222 receives the deviation calculated by the subtractor 221 as an input and calculates the valve opening degree command the HPCV via a PI operation (proportional integral operation). A range of the valve opening degree command value is 0 to 100. The maximum value selector 224 outputs the larger of "0" 223 and a calculated value of the PI controller 222. In a case where the calculated value of the PI controller 222 is 0 or more, the maximum value selector 224 outputs the calculated value of the PI controller 222. The HP main steam target pressure is determined, for example, from the load of the gas turbine 10 or the like as described above. The HP main steam pressure is the upstream-side pressure of the high-pressure main steam regulating valve 43 measured by the pressure gauge 71. The valve opening degree calculation unit 220 controls the HPCV valve opening degree command value via feedback control so that the deviation between the HP main steam target pressure and the HP main steam pressure is eliminated. A control element is not limited to the PI operation, and may be a PID operation (proportional integral derivative operation) or may be replaced with a control element using a model such as a machine learning model.

The valve opening degree upper limit calculation unit 210 includes an HPST inlet pressure threshold calculation unit 211, a subtractor 212, and a PI controller 213. The valve opening degree upper limit calculation unit 210 calculates an upper limit of the HPCV valve opening degree. The valve opening degree upper limit calculated by the valve opening degree upper limit calculation unit 210 and the valve opening degree command value of the HPCV calculated by the valve opening degree calculation unit 220 are input to the minimum value selector 230, and the smaller thereof is output. Therefore, the valve opening degree command value of the HPCV output by the calculation unit 200 is limited by the valve opening degree upper limit calculated by the valve opening degree upper limit calculation unit 210.

The HPST inlet pressure threshold calculation unit 211 calculates an HPST inlet pressure threshold using the boundary line B_HPST, which is a reference when controlling the valve opening degree of the HPCV described with reference to FIG. 2, based on each measurement value of the IPST inlet pressure and the HPST inlet pressure. The HPST inlet pressure threshold serves as a reference for determining whether or not to start the control of the upper limit (PI control), and is also a target value with respect to an HPST input pressure when the upper limit is controlled. Assuming that the IPST inlet pressure is PL1, for example, as shown in FIG. 5, the HPST inlet pressure threshold calculation unit 211 calculates a HPST inlet pressure corresponding to an intersection C10 with the boundary line B_HPST as the HPST inlet pressure threshold.

The subtractor 212 calculates a deviation of the HPST inlet pressure with respect to the HPST inlet pressure threshold by subtracting the HPST inlet pressure from the HPST inlet pressure threshold. The PI controller 213 receives the deviation calculated by the subtractor 212 as an input, and calculates the upper limit of the valve opening degree of the HPCV via the PI operation (proportional integral operation). A control element is not limited to the PI operation, and may be a PID operation (proportional integral derivative operation) or may be replaced with a control element using a model such as a machine learning model.

As described above, the minimum value selector 230 receives the valve opening degree upper limit calculated by the valve opening degree upper limit calculation unit 210 and the valve opening degree command value of the HPCV calculated by the valve opening degree calculation unit 220 as inputs, and outputs the smaller thereof.

The calculation unit 400 shown in FIG. 4 includes a valve opening degree upper limit calculation unit 410, a valve opening degree calculation unit 420, and a minimum value selector 430.

The valve opening degree calculation unit 420 includes a subtractor 421, a PI controller (proportional integral controller) 422, and a maximum value selector 424. The subtractor 421 calculates a deviation of an IP main steam pressure with respect to the target value by subtracting a medium-pressure main steam pressure (IP main steam pressure) from a medium-pressure main steam target pressure (IP main steam target pressure). The PI controller 422 receives the deviation calculated by the subtractor 421 as an input, and calculates the valve opening degree command value of the IPCV via a PI operation. A range of the valve opening degree command value is 0 to 100. The maximum value selector 424 outputs the larger of "0" 423 and a calculated value of the PI controller 422. In a case where the calculated value of the PI controller 422 is 0 or more, the maximum value selector 424 outputs the calculated value of the PI controller 422. The IP main steam target pressure is determined, for example, from the load of the gas turbine 10 or the like. The IP main steam pressure is an upstream-side pressure of the medium-pressure main steam regulating valve 46 measured by the pressure gauge 73. The valve opening degree calculation unit 420 controls the IPCV valve opening degree command value via feedback control so that the deviation between the IP main steam target pressure and the IP main steam pressure is eliminated. A control element is not limited to the PI operation, and may be a PID operation or may be replaced with a control element using a model such as a machine learning model.

The valve opening degree upper limit calculation unit 410 includes an IPST inlet pressure threshold calculation unit 411, a subtractor 412, and a PI controller 413. The valve opening degree upper limit calculation unit 410 calculates an upper limit of the IPCV valve opening degree. The valve opening degree upper limit calculated by the valve opening degree upper limit calculation unit 410 and the valve opening degree command value of the IPCV calculated by the valve opening degree calculation unit 420 are input to the minimum value selector 430, the smaller and thereof is output. Therefore, the valve opening degree command value of the IPCV output by the calculation unit 400 is limited by the valve opening degree upper limit calculated by the valve opening degree upper limit calculation unit 410.

The IPST inlet pressure threshold calculation unit 411 calculates an IPST inlet pressure threshold using the boundary line B_IPST, which is a reference when controlling the valve opening degree of the IPCV described with reference to FIG. 2, based on each measurement value of the IPST inlet pressure and the HPST inlet pressure. The IPST inlet pressure threshold serves as a reference for determining whether or not to start the control of the upper limit (PI control), and is also a target value with respect to an IPST input pressure when the upper limit is controlled. Assuming that the HPST inlet pressure is PH1, for example, as shown in FIG. 6, the IPST inlet pressure threshold calculation unit 411 calculates an IPST inlet pressure corresponding to an intersection C20 with the boundary line B_IPST as the IPST inlet pressure threshold.

The subtractor 412 calculates a deviation of the IPST inlet pressure with respect to the IPST inlet pressure threshold by subtracting the IPST inlet pressure from the IPST inlet pressure threshold. The PI controller 413 receives the deviation calculated by the subtractor 412 as an input, and calculates the upper limit of the valve opening degree of the IPCV via the PI operation (proportional integral operation). A control element is not limited to the PI operation, and may be a PID operation (proportional integral derivative operation) or may be replaced with a control element using a model such as a machine learning model.

As described above, the minimum value selector 430 receives the valve opening degree upper limit calculated by the valve opening degree upper limit calculation unit 410 and the valve opening degree command value of the IPCV calculated by the valve opening degree calculation unit 420 as inputs, and outputs the smaller thereof.

Actions and Effects

As described above, according to the control device, the control method, and the system of the present disclosure, the valve opening degree of the HPCV and the valve opening degree of the IPCV can be controlled so that the correspondence relation between the HP ST inlet pressure and the IPST inlet pressure becomes appropriate. Therefore, the thrust force due to the imbalance between the HPST inlet pressure and the IPST inlet pressure in the steam turbine 30 can be controlled to be within the allowable value.

In addition, according to the present embodiment, even in a case where an event occurs in which an imbalance is caused by a transitional increase (or decrease) in system internal pressure such as the start of the steam turbine 30, the load cutoff, a runback, a change in load, the closing operation of the ventilator valve, and abnormal opening of the HP turbine bypass valve, ST operation can be continued in a normal thrust balance.

Second Embodiment

Figure 7:
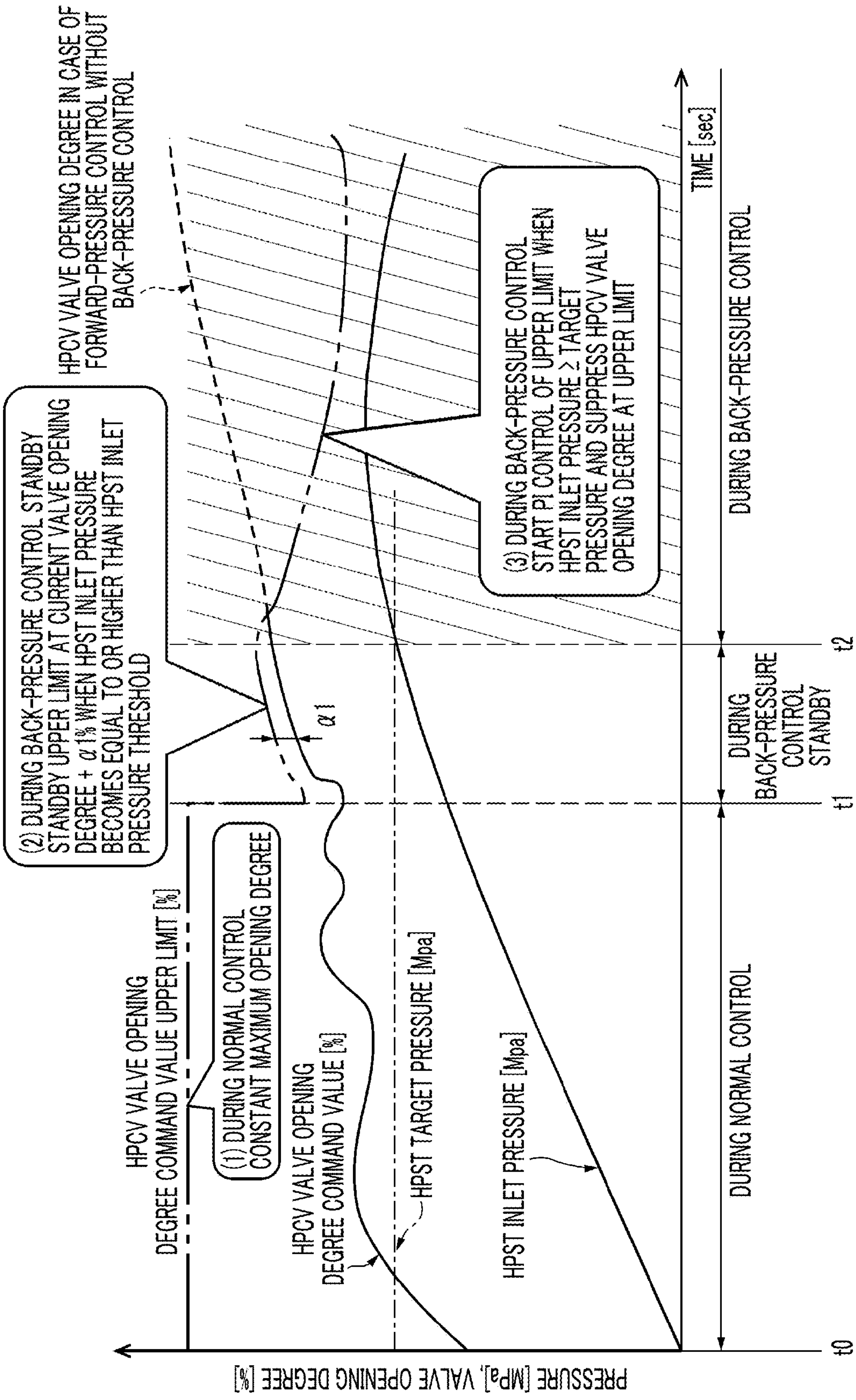
FIG. 7 is a schematic diagram for describing an operation example of a control device according to a second embodiment of the present disclosure.
Figure 8:
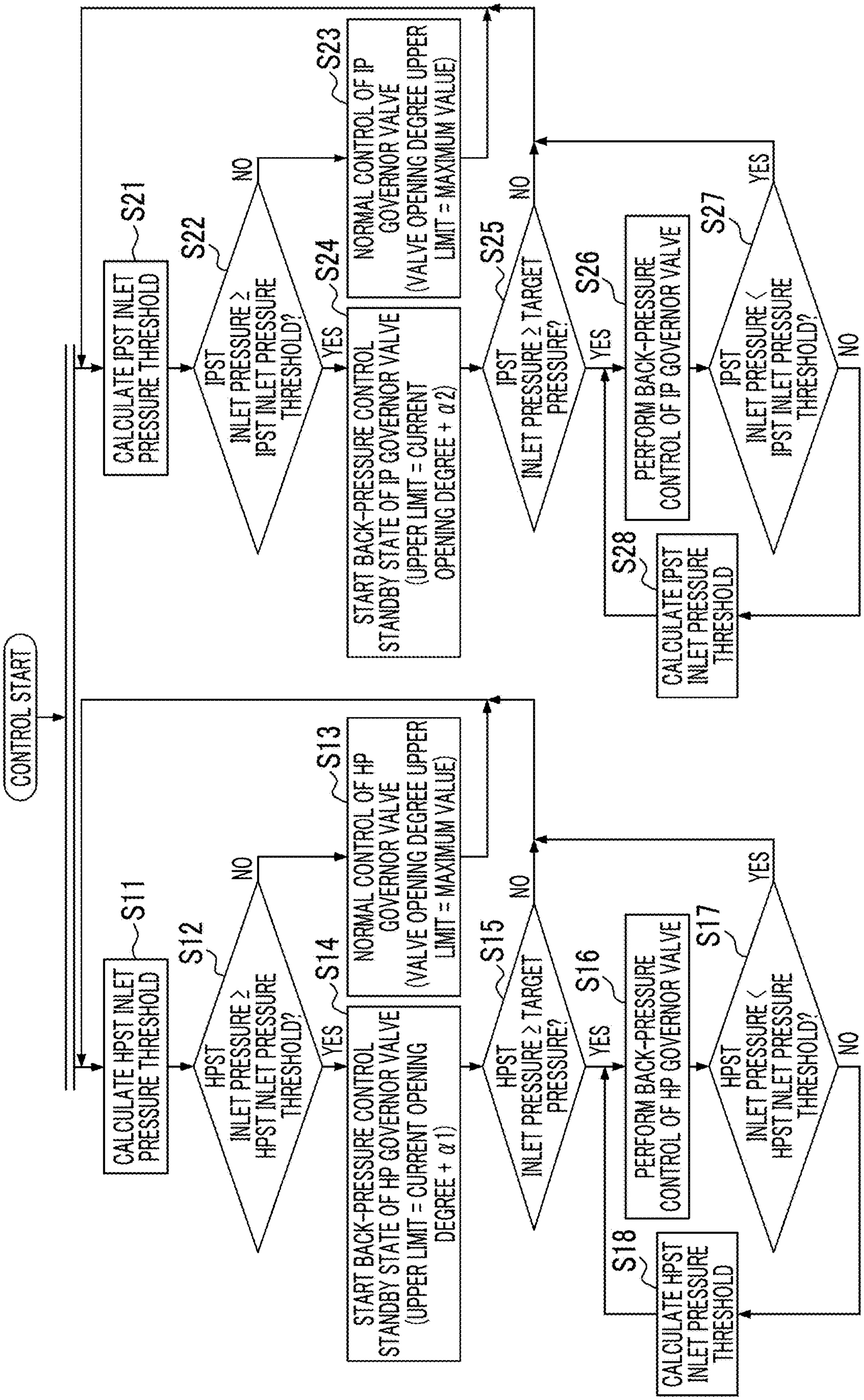
FIG. 8 is a flowchart showing the operation example of the control device according to the second embodiment of the present disclosure.

Hereinafter, a control device according to a second embodiment of the present disclosure will be described with reference to FIGS. 7 and 8. FIG. 7 is a schematic diagram for describing an operation example of the control device according to the second embodiment of the present disclosure. FIG. 8 is a flowchart showing the operation example of the control device according to the second embodiment of the present disclosure.

A configuration of the system 1 according to the second embodiment is basically the same as the configuration of the system 1 according to the first embodiment. However, in the second embodiment, an operation of the control unit 102 included in the control device 100 shown in FIG. 1 is partially different from that in the first embodiment.

An operation example of the control unit 102 of the control device 100 of the second embodiment will be described with reference to FIG. 7. In the second embodiment, the control unit 102 selects one of three different modes: (1) during normal control, (2) during back-pressure control standby, and (3) during back-pressure control, and controls the upper limit of the valve opening degree of the HPCV and the upper limit of the valve opening degree of the IPCV. FIG. 7 shows an example of a change over time in the upper limit of the HPCV opening degree command value, the HPCV opening degree command value, and the HPST inlet pressure when the gas turbine 10 is started. In the example shown in FIG. 7, after the start, the modes are changed in the order of (1) during normal control, (2) during back-pressure control standby, and (3) during back-pressure control. The back-pressure control is control in which the upper limit is controlled by the HPST inlet pressure which is a pressure on a downstream side of the HPCV, and is the same as the control of the upper limit in the first embodiment. The control based on the pressure on the downstream side of the HPCV is referred to as back-pressure control. The control of the upper limit of the IPCV opening degree command value is the same as the control of the upper limit of the HPCV opening degree command value. Hereinafter, the control of the upper limit of the HPCV opening degree command value will be described as an example.

(1) During normal control: When the steam turbine 30 is started, the amount of heat input to the heat recovery steam generator 20 increases with the load of the gas turbine 10, and the amount of steam increases accordingly. Therefore, during the normal control, for example, a target value of the HPCV valve opening degree command value is increased as a function of the load of the gas turbine 10, and the HPCV is gradually opened. When HP-side and IP-side ST inlet pressures are within preset normal ranges, the upper limit of the valve opening degree command value is set to a constant maximum opening degree.

(2) During back-pressure control standby: When the HPST inlet pressure approaches the HPST inlet pressure threshold determined by the boundary line B_HPST shown in FIG. 5 and the HPST inlet pressure becomes equal to or higher than the HPST inlet pressure threshold, the valve opening degree upper limit is changed to a current valve opening degree+$\alpha 1$. By causing the upper limit to stand by at the current valve opening degree+$\alpha 1$, it becomes possible to quickly close the valve when the HPST inlet pressure is about to deviate from the allowable range.

(3) During back-pressure control: When an event such as the closing operation of the ventilator valve 66 or the abnormal opening of the high-pressure steam turbine bypass valve 63 causes a sudden change in the system internal pressure and the system internal pressure is about to deviate from the range, in the same manner as in the first embodiment, the HPCV valve is closed according to the upper limit output by the valve opening degree upper limit calculation unit 210, and the correspondence relation between the HPST inlet pressure and the IPST inlet pressure can be kept within the normal range.

In the example shown in FIG. 7, the normal control is performed at times t0 to t1. At time t1, the HPST input pressure becomes equal to or higher than an HPST input pressure threshold (not shown), and the normal control is transitioned to the back-pressure control standby. Then, at time t2, the HPST input pressure becomes equal to or higher than an HPST target pressure, and the back-pressure control is performed.

During the normal control, the upper limit of the HPCV valve opening degree command value indicated by a two-dot chain line becomes the constant maximum opening degree. In addition, during the normal control, the HPCV valve opening degree command value is set toward the HPST target pressure indicated by a one-dot chain line, and the HPST input pressure rises. During the back-pressure control standby, the upper limit of the HPCV valve opening degree command value is set to the current valve opening degree+α1%. Then, during the back-pressure control, PI control of the upper limit is started, and the HPCV valve opening degree is suppressed at the upper limit. The HPCV valve opening degree in a case of forward-pressure control without the back-pressure control continues to increase, for example, as indicated by a broken line. Here, the forward-pressure control is control based on a pressure on an upstream side of the HPCV.

Next, a flow of processing in the control unit 102 of the control device 100 of the second embodiment will be described with reference to FIG. 8. In FIG. 8, the HPCV is referred to as an HP governor valve, and the IPCV is referred to as an IP governor valve. The control unit 102 of the second embodiment performs in parallel the control of the valve opening degree of the HPCV (HP governor valve) via a process of steps S11 to S18 and the control of the valve opening degree of the IPCV (IP governor valve) via a process of steps S21 to S28.

When the control is started, the control unit 102 calculates the HPST inlet pressure threshold based on the IPST inlet pressure with reference to the boundary line B_HPST in the correspondence relation between the HPST input pressure and the IPST input pressure shown in FIG. 5 (step S11). The process of step S11 is performed at predetermined time intervals. Next, the control unit 102 determines whether or not the HPST inlet pressure is equal to or higher than the HPST inlet pressure threshold (step S12). In a case where the HPST inlet pressure is not equal to or higher than the HPST inlet pressure threshold (NO in step S12), the control unit 102 performs the normal control of the HP governor valve with the valve opening degree upper limit as the maximum value (step S13), and returns to step S11. In a case where the HPST inlet pressure is equal to or higher than the HPST inlet pressure threshold (YES in step S12), the control unit 102 sets the valve opening degree upper limit to the current opening degree+α1 and transitions to a back-pressure control standby state of the HP governor valve (step S14), and determines whether or not the HPST inlet pressure is equal to or higher than the target pressure (step S15).

In a case where the HPST inlet pressure is not equal to or higher than the target pressure (NO in step S15), the control unit 102 returns the process to step S11. In a case where the HPST inlet pressure is equal to or higher than the target pressure (YES in step S15), the control unit 102 performs the back-pressure control of the HP governor valve (step S16), and determines whether or not the HPST inlet pressure is less than the HPST inlet pressure threshold (step S17). In a case where the HPST inlet pressure is not less than the HPST inlet pressure threshold (NO in step S17), the control unit 102 calculates the HPST inlet pressure threshold (step S18), and performs the process of step S16 after a predetermined time. In a case where the HPST inlet pressure is less than the HPST inlet pressure threshold (YES in step S17), the control unit 102 returns the process to step S11.

In addition, when the control is started, in parallel with the above process, the control unit 102 calculates the IPST inlet pressure threshold based on the HPST inlet pressure with reference to the boundary line B_IPST in the correspondence relation between the HPST input pressure and the IPST input pressure shown in FIG. 6. (step S21). The process of step S21 is performed at predetermined time intervals. Next, the control unit 102 determines whether or not the IPST inlet pressure is equal to or higher than the IPST inlet pressure threshold (step S22). In a case where the IPST inlet pressure is not equal to or higher than the IPST inlet pressure threshold (NO in step S22), the control unit 102 performs the normal control of the IP governor valve (step S23) with the valve opening degree upper limit as the maximum value, and returns to step S21. In a case where the IPST inlet pressure is equal to or higher than the IPST inlet pressure threshold (step S22: YES), the control unit 102 sets the valve opening degree upper limit to the current opening degree+α2, and transitions to a back-pressure control standby state of the IP governor valve (step S24), and determines whether or not the IPST inlet pressure is equal to or higher than the target pressure (step S25). In addition, α2 is a constant value on an IPST inlet pressure side corresponding to α1.

In a case where the IPST inlet pressure is not equal to or higher than the target pressure (NO in step S25), the control unit 102 returns the process to step S21. In a case where the IPST inlet pressure is equal to or higher than the target pressure (YES in step S25), the control unit 102 performs the back-pressure control of the IP governor valve (step S26), and determines whether or not the IPST inlet pressure is less than the IPST inlet pressure threshold (step S27). In a case where the IPST inlet pressure is not less than the IPST inlet pressure threshold (NO in step S27), the control unit 102 calculates the IPST inlet pressure threshold (step S28), and performs the process of step S26 after a predetermined time. In a case where the IPST inlet pressure is less than the IPST inlet pressure threshold (YES in step S27), the control unit 102 returns the process to step S21.

As described above, according to the control device, the control method, and the system of the present disclosure, the valve opening degree of the HPCV and the valve opening degree of the IPCV can be controlled so that the correspondence relation between the HPST inlet pressure and the IPST inlet pressure becomes appropriate. Therefore, the thrust force due to the imbalance between the HPST inlet pressure and the IPST inlet pressure in the steam turbine 30 can be controlled to be within the allowable value.

In addition, according to the present embodiment, the control unit 102 controls the upper limit of the valve opening degree of the HPCV and the upper limit of the valve opening degree of the IPCV by selectively setting the upper limits of the valve opening degree of the HPCV and the valve opening degree of the IPCV to any of the maximum value of each valve opening degree, each value increased by a predetermined amount (α1 or α2) from each current value of the HPST inlet pressure and the IPST inlet pressure, or each value with reference to the region A1. According to this configuration, the valve can be quickly closed when the HPST inlet pressure or the IPST inlet pressure is about to deviate from the allowable range.

Third Embodiment

Figure 9:
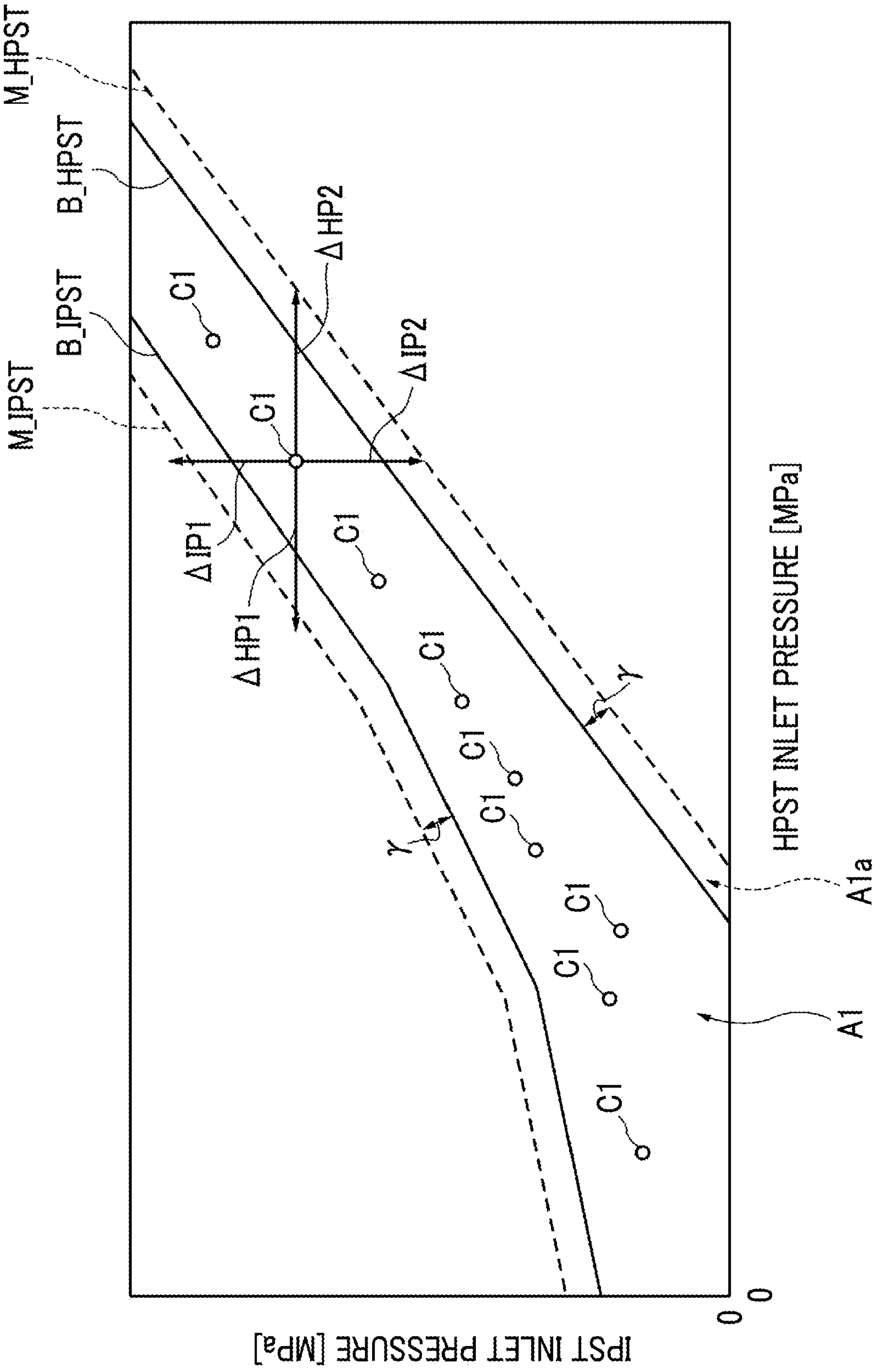
FIG. 9 is a schematic diagram for describing a control device according to a third embodiment of the present disclosure.

Next, a control device according to a third embodiment of the present disclosure will be described with reference to FIG. 9. FIG. 9 is a schematic diagram for describing the control device according to the third embodiment of the present disclosure.

The third embodiment presents a procedure for determining a thrust balance target range (the region A1 in FIG. 2)

shown in the first embodiment. In the third embodiment, the region A1 (range) is determined by the following procedure.

(S1) A plurality of points C1 of a combination of the HPST inlet pressure and the IPST inlet pressure in which the thrust forces of the HPST and the IPST are balanced are obtained.

(S2) A maximum region (HP-side bias or IP-side bias) of the thrust force that can be allowed when the HP-side or IP-side ST inlet pressure is biased is obtained from the points C1 at which the thrust forces are balanced. In the example shown in FIG. 9, a range in which the HPST inlet pressure at the point C1 of the combination is biased by ΔHP1 and ΔHP2 and a range in which the IPST inlet pressure at the point C1 is biased by ΔIP1 and ΔIP2 are obtained. For each point C1, in the same manner, a range in which the HPST inlet pressure is biased and a range in which the IPST inlet pressure is biased are obtained. Then, a region A1*a* sandwiched between a boundary line M_HPST and a boundary line M_IPST indicated by broken lines is determined such that the region A1*a* does not exceed the range in which the HPST inlet pressure is biased and the range in which the IPST inlet pressure is biased at each point C1.

(S3) The boundary line B_HPST and the boundary line B_IPST of the region A1 are defined by subtracting a constant γ (adjustment term) from the boundary line M_HPST and the boundary line M_IPST of the HPST inlet pressure and the IPST inlet pressure obtained in (S2).

As described above, in the present embodiment, the region A1 (range) described with reference to FIG. 2 corresponds to the region A1*a* in which the thrust force in a case where one of the HPST inlet pressure or the IPST inlet pressure is biased is equal to or less than a maximum allowable value, from the combination point C1 of the HPST inlet pressure and the IPST inlet pressure at which the thrust force due to the HPST and the thrust force due to the IPST are balanced. In addition, the control unit 102 controls the valve opening degree of the HPCV and the valve opening degree of the IPCV according to the HPST inlet pressure and the IPST inlet pressure with reference to the region A1 (range) obtained by subtracting a predetermined constant γ from a boundary of the region A1*a* toward an inside of the region A1*a*.

According to the present embodiment, the thrust force can be suppressed to a limited range.

Other Embodiments

While the embodiments of the present disclosure have been described above in detail with reference to the drawings, the specific configuration is not limited to the embodiments, and includes design changes and the like within a scope not departing from the gist of the present disclosure.

<Computer Configuration>

Figure 10:
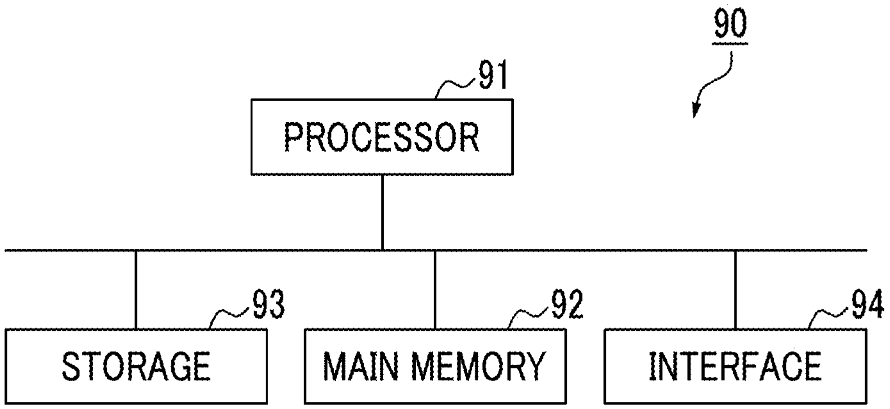
FIG. 10 is a schematic block diagram showing a configuration of a computer according to at least one embodiment.

FIG. 10 is a schematic block diagram showing a configuration of a computer according to at least one embodiment.

A computer 90 includes a processor 91, a main memory 92, a storage 93, and an interface 94.

The above-described control device 100 is mounted on the computer 90. An operation of each processing unit described above is stored in the storage 93 in the form of a program. The processor 91 reads out the program from the storage 93, loads the program into the main memory 92, and executes the above process according to the program. In addition, the processor 91 secures a storage area corresponding to each storage unit described above in the main memory 92 according to the program.

The program may be intended to realize some of functions performed by the computer 90. For example, the program may exhibit its function by using a combination with other programs already stored in the storage or by using a combination with other programs implemented on other devices. In another embodiment, the computer may include a custom large scale integrated circuit (LSI) such as a programmable logic device (PLD) in addition to or in place of the above configuration. Examples of the PLD include a programmable array logic (PAL), a generic array logic (GAL), a complex programmable logic device (CPLD), and a field-programmable gate array (FPGA). In this case, a part or all of the functions realized by the processor may be realized by the integrated circuit.

Examples of the storage 93 include a hard disk drive (HDD), a solid-state drive (SSD), a magnetic disk, an optical magnetic disk, a compact disc read-only memory (CD-ROM), a digital versatile disc read-only memory (DVD-ROM), and a semiconductor memory. The storage 93 may be an internal medium directly connected to a bus in the computer 90 or may be an external medium connected to the computer 90 via an interface 94 or via a communication line. In a case where the program is distributed to the computer 90 through the communication line, the computer 90 that receives the distribution may load the program into the main memory 92 and execute the above process. In at least one embodiment, the storage 93 is a non-transitory tangible storage medium.

Additional Notes

The control device 100 described in each embodiment is understood as follows, for example.

(1) The control device 100 according to a first aspect includes: the acquisition unit 101 that acquires, when viewed from a first control valve of a first turbine (high-pressure steam turbine 31) that rotates using first steam (high-pressure steam) supplied from a first inlet (steam inlet 311) via the first control valve (high-pressure main steam regulating valve 43), a pressure value of the first steam on a first inlet side as a first inlet pressure, and acquires, when viewed from a second control valve of a second turbine (medium-pressure steam turbine 32) that rotates about a same rotary shaft 36 as the first turbine using second steam supplied from a second inlet (steam inlet 321) via the second control valve (medium-pressure main steam regulating valve 46), a pressure value of the second steam on a second inlet side as a second inlet pressure; and the control unit 102 that controls a valve opening degree of the first control valve and a valve opening degree of the second control valve according to the first inlet pressure and the second inlet pressure. According to this aspect and each of the following aspects, a thrust force in the steam turbine can be controlled within an allowable value.

(2) The control device 100 of a second aspect is the control device of (1), in which the control unit 102 controls the valve opening degree of the first control valve and the valve opening degree of the second control valve according to the first inlet pressure and the second inlet pressure with reference to a predetermined range (region A1) with respect to a correspondence relation between the first inlet pressure and the second inlet pressure at which a thrust force applied to the rotary shaft 36 becomes appropriate based on the correspondence relation (equilibrium characteristic). According to this aspect, the valve opening degree of the first control valve and the valve opening degree of the second control valve can be adjusted so that the correspondence relation between the first inlet pressure and the second inlet pressure becomes appropriate. The thrust force due to the imbalance between the first inlet pressure and the second inlet pressure in the steam turbine 30 can be controlled within the allowable value.

(3) The control device 100 of a third aspect is the control device 100 of (2), in which the control unit 102 controls, in a case where the range (region A1) is expressed in Cartesian coordinates in which a horizontal axis represents one of the first inlet pressure and the second inlet pressure and a vertical axis represents the other of the first inlet pressure and the second inlet pressure, one of the first control valve and the second control valve with reference to an upper boundary line (B_IPST) side of the range, and controls the other of the first control valve and the second control valve with reference to a lower boundary line (B_HPST) side of the range.

(4) The control device 100 of a fourth aspect is the control device 100 of (2) or (3), in which the range (region A1) corresponds to, in a case where one of the first inlet pressure or the second inlet pressure is biased from a combination (C1) of the first inlet pressure and the second inlet pressure in which a thrust force by the first turbine and a thrust force by the second turbine are balanced, a region A1*a* in which the thrust force is equal to or less than a maximum allowable value.

(5) The control device 100 of a fifth aspect is the control device 100 of (4), in which the control unit 102 controls the valve opening degree of the first control valve and the valve opening degree of the second control valve according to the first inlet pressure and the second inlet pressure, using a region A1 obtained by subtracting a predetermined constant γ from a boundary of the region Ala toward an inside of the region A1*a* as the range (region A1).

(6) The control device 100 of a sixth aspect is the control device 100 of (2) to (5), in which the control unit 102 controls the valve opening degree of the first control valve and the valve opening degree of the second control valve according to the first inlet pressure and the second inlet pressure by controlling an upper limit of the valve opening degree of the first control valve and an upper limit of the valve opening degree of the second control valve. According to this aspect, for example, feedback control of a pressure on an upstream side of the first control valve by the first control valve, feedback control of a pressure on an upstream side of the second control valve by the second control valve, and the like can be easily combined.

(7) The control device 100 of a seventh aspect is the control device 100 of (6), in which the control unit 102 controls the upper limit of the valve opening degree of the first control valve and the upper limit of the valve opening degree of the second control valve by selectively setting the upper limits of the valve opening degree of the first control valve and the valve opening degree of the second control valve to any of a maximum value of each of the valve opening degrees, each value increased by a predetermined amount (α1, α2) from each current value of the first inlet pressure and the second inlet pressure, or each value with reference to the range (region A1). According to this aspect, responsiveness of the control based on the upper limits can be improved.

INDUSTRIAL APPLICABILITY

According to each aspect of the present invention, a thrust force in a steam turbine can be controlled within an allowable value.

REFERENCE SIGNS LIST

1: System
10: Gas turbine
11: Compressor
12: Combustor
13: Turbine
14: Fuel flow rate control valve
20: Heat recovery steam generator
21: High-pressure steam generating section
22: Medium-pressure steam generating section
23: Reheating section
24: Low-pressure steam generating section
30: Steam turbine
31: High-pressure steam turbine
32: Medium-pressure steam turbine
33: Low-pressure steam turbine
34: Generator
35: Condenser
41: High-pressure main steam line
42: High-pressure steam stop valve
43: High-pressure main steam regulating valve
44, 61, 62: Medium-pressure main steam line
45: Medium-pressure steam stop valve
46: Medium-pressure main steam regulating valve
51: Low-pressure main steam line
52: Low-pressure steam stop valve
53: Low-pressure main steam regulating valve
54: Medium-pressure turbine exhaust line
55: Supply water line
56: Exhaust line
63: High-pressure steam turbine bypass valve
65: Medium-pressure steam turbine bypass valve
66: Ventilator valve
71, 72, 73, 74, 75, 76: Pressure gauge
100: Control device
101: Acquisition unit
102: Control unit

The invention claimed is:

1. A control device comprising:

an acquisition unit that acquires, when viewed from a first control valve of a first turbine that rotates using first steam supplied from a first inlet via the first control valve, a pressure value of the first steam on a first inlet side as a first inlet pressure, and acquires, when viewed from a second control valve of a second turbine that rotates about a same rotary shaft as the first turbine using second steam supplied from a second inlet via the second control valve, a pressure value of the second steam on a second inlet side as a second inlet pressure; and a control unit that controls a valve opening degree of the first control valve and a valve opening degree of the second control valve according to the first inlet pressure and the second inlet pressure, wherein the control unit controls the valve opening degree of the first control valve and the valve opening degree of the second control valve according to the first inlet pressure and the second inlet pressure with reference to a predetermined range with respect to a correspondence relation between the first inlet pressure and the second inlet pressure at which a thrust force applied to the rotary shaft becomes appropriate based on a correspondence relation, and wherein the control unit controls, in a case where the range is expressed in Cartesian coordinates in which a horizontal axis represents one of the first inlet pressure and the second inlet pressure and a vertical axis represents the other of the first inlet pressure and the second inlet pressure, one of the first control valve and the second control valve so that the one of the first control valve and the second control valve is throttled with reference to an upper boundary line side of the range, and controls the other of the first control valve and the second control valve so that the other of the first control valve and the second control valve is throttled with reference to a lower boundary line side of the range.

2. The control device according to claim 1, wherein the range corresponds to, in a case where one of the first inlet pressure or the second inlet pressure is biased from a combination of the first inlet pressure and the second inlet pressure in which a thrust force by the first turbine and a thrust force by the second turbine are balanced, a region in which the thrust force is equal to or less than a maximum allowable value.

3. The control device according to claim 2, wherein the control unit controls the valve opening degree of the first control valve and the valve opening degree of the second control valve according to the first inlet pressure and the second inlet pressure, using a region obtained by subtracting a predetermined constant from a boundary of the region toward an inside of the region as the range.

4. The control device according to claim 1, wherein the control unit controls the valve opening degree of the first control valve and the valve opening degree of the second control valve according to the first inlet pressure and the second inlet pressure by controlling an upper limit of the valve opening degree of the first control valve and an upper limit of the valve opening degree of the second control valve.

5. The control device according to claim 4, wherein the control unit controls the upper limit of the valve opening degree of the first control valve and the upper limit of the valve opening degree of the second control valve by selectively setting the upper limits of the valve opening degree of the first control valve and the valve opening degree of the second control valve to any of a maximum value of each of the valve opening degrees, each value increased by a predetermined amount from each current value of the first inlet pressure and the second inlet pressure, or each value with reference to the range.

6. A control method comprising:

a step of acquiring, when viewed from a first control valve of a first turbine that rotates using first steam supplied from a first inlet via the first control valve, a pressure value of the first steam on a first inlet side as a first inlet pressure, and acquiring, when viewed from a second control valve of a second turbine that rotates about a same rotary shaft as the first turbine using second steam supplied from a second inlet via the second control valve, a pressure value of the second steam on a second inlet side as a second inlet pressure; and a step of controlling a valve opening degree of the first control valve and a valve opening degree of the second control valve according to the first inlet pressure and the second inlet pressure, wherein, in the step of controlling, controlling the valve opening degree of the first control valve and the valve opening degree of the second control valve according to the first inlet pressure and the second inlet pressure with reference to a predetermined range with respect to a correspondence relation between the first inlet pressure and the second inlet pressure at which a thrust force applied to the rotary shaft becomes appropriate based on a correspondence relation, and wherein, in the step of controlling, controlling, in a case where the range is expressed in Cartesian coordinates in which a horizontal axis represents one of the first inlet pressure and the second inlet pressure and a vertical axis represents the other of the first inlet pressure and the second inlet pressure, one of the first control valve and the second control valve so that the one of the first control valve and the second control valve is throttled with reference to an upper boundary line side of the range, and controlling the other of the first control valve and the second control valve so that the other of the first control valve and the second control valve is throttled with reference to a lower boundary line side of the range.

7. A system comprising:

a first control valve;

a second control valve;

a first turbine that rotates using first steam supplied from a first inlet via the first control valve;

a second turbine that rotates about a same rotary shaft as the first turbine using second steam supplied from a second inlet via the second control valve;

an acquisition unit that acquires, when viewed from the first control valve, a pressure value of the first steam on a first inlet side as a first inlet pressure, and acquires, when viewed from the second control valve, a pressure value of the second steam on a second inlet side as a second inlet pressure; and a control unit that controls a valve opening degree of the first control valve and a valve opening degree of the second control valve according to the first inlet pressure and the second inlet pressure, wherein the control unit controls the valve opening degree of the first control valve and the valve opening degree of the second control valve according to the first inlet pressure and the second inlet pressure with reference to a predetermined range with respect to a correspondence relation between the first inlet pressure and the second inlet pressure at which a thrust force applied to the rotary shaft becomes appropriate based on a correspondence relation, and wherein the control unit controls, in a case where the range is expressed in Cartesian coordinates in which a horizontal axis represents one of the first inlet pressure and the second inlet pressure and a vertical axis represents the other of the first inlet pressure and the second inlet pressure, one of the first control valve and the second control valve so that the one of the first control valve and the second control valve is throttled with reference to an upper boundary line side of the range, and controls the other of the first control valve and the second control valve so that the other of the first control valve and the second control valve is throttled with reference to a lower boundary line side of the range.

* * * * *